United States Patent
Sagi

[11] Patent Number: 6,148,362
[45] Date of Patent: Nov. 14, 2000

[54] MICROCOMPUTER USING NONVOLATILE SEMICONDUCTOR MEMORY TO STORE USER CODE/DATA

[75] Inventor: Katsuichi Sagi, Tokyo, Japan

[73] Assignee: NEC Corporation, Tokyo, Japan

[21] Appl. No.: 09/081,634

[22] Filed: May 20, 1998

[30] Foreign Application Priority Data

May 29, 1999 [JP] Japan ................................. 9-139768

[51] Int. Cl.[7] ................................................. G06F 12/00
[52] U.S. Cl. ................................................. 711/102; 711/103
[58] Field of Search ................................. 711/102, 103, 711/115

[56] References Cited

FOREIGN PATENT DOCUMENTS

| 5-204654 | 8/1993 | Japan . |
| 5-266219 | 10/1993 | Japan . |
| 8-255084 | 10/1996 | Japan . |
| 8-305680 | 11/1996 | Japan . |

*Primary Examiner*—Jack A. Lane
*Attorney, Agent, or Firm*—McGinn & Gibb, P.C.

[57] ABSTRACT

The microcomputer according to the present invention is prepared with differing address space for use during normal operations and during rewrite control, whereby, when modifying a rewrite control program, the production of new user code/data can be avoided for cases in which there are actually no modifications of the user code/data. In other words, the microcomputer switches between user ROM during normal operation and rewrite control ROM during rewrite control, and user code/data and rewrite control program are arranged in differing address space.

18 Claims, 6 Drawing Sheets

MICROCOMPUTER USING NONVOLATILE SEMICONDUCTOR MEMORY TO STORE USER CODE/DATA

BACKGROUND OF THE INVENTION

1. Field of the Invention

The present invention relates to a microcomputer, and particularly to a microcomputer that, as storage regions, is provided with a memory device such as a mask Read Only Memory (ROM) and an electrically erasable and writable nonvolatile semiconductor memory device such as a flash memory or Electrically Erasable and Programmable Read Only Memory (EEPROM).

2. Description of the Related Art

Generally, microcomputers are manufactured so as to receive both code that is programmed by the user and data that are consulted in accordance with the code and which must be stored according to the user's instructions (hereinbelow referred to as "user code/data") and to operate in accordance with this user code/data.

Because a microcomputer is conventionally provided with only mask ROM, which cannot be repeatedly rewritten (hereinbelow, a microcomputer provided with this configuration is referred to as a "microcomputer of the first example of the prior art"), this type of user code/data is inevitably stored in such mask ROM.

When the user code/data is to be modified, therefore, a microcomputer having the configuration of the first example of the prior art must be manufactured anew with the new user code/data, and this necessity is obviously disadvantageous from the viewpoint of cost.

To solve this problem of the first example of the prior art, microcomputers have been proposed in recent years that are provided with writable memory such as flash memory in place of mask ROM (such microcomputers are referred to as the second example of the prior art hereinbelow). A microcomputer according to the second example of the prior art operates according to user code/data that are written to, for example, flash memory, and when there is a modification of the user code/data, this change can be dealt with by rewriting the content of the flash memory.

However, in the configuration of the second example of the prior art, several problems have arisen along with the increase in the volume of the user code/data, i.e., increase in the size of applications. When the size of an application increases, the memory size for storing this user code/data must also increase. It is well known, however, that the size of memory cells in flash memory is generally much greater than the size of memory cells in mask ROM. As a result, if all of the user code/data are stored in flash memory, the chip size of the microcomputer expands with the increase in the application size, with the accompanying problem that chip cost increases accordingly.

A microcomputer has been proposed as the third embodiment of Japanese Patent Laid-open No. 266219/1993 (hereinbelow referred to as the third example of the prior art) as a means of balancing the problems inherent to the first and second examples of the prior art.

Figure 1:
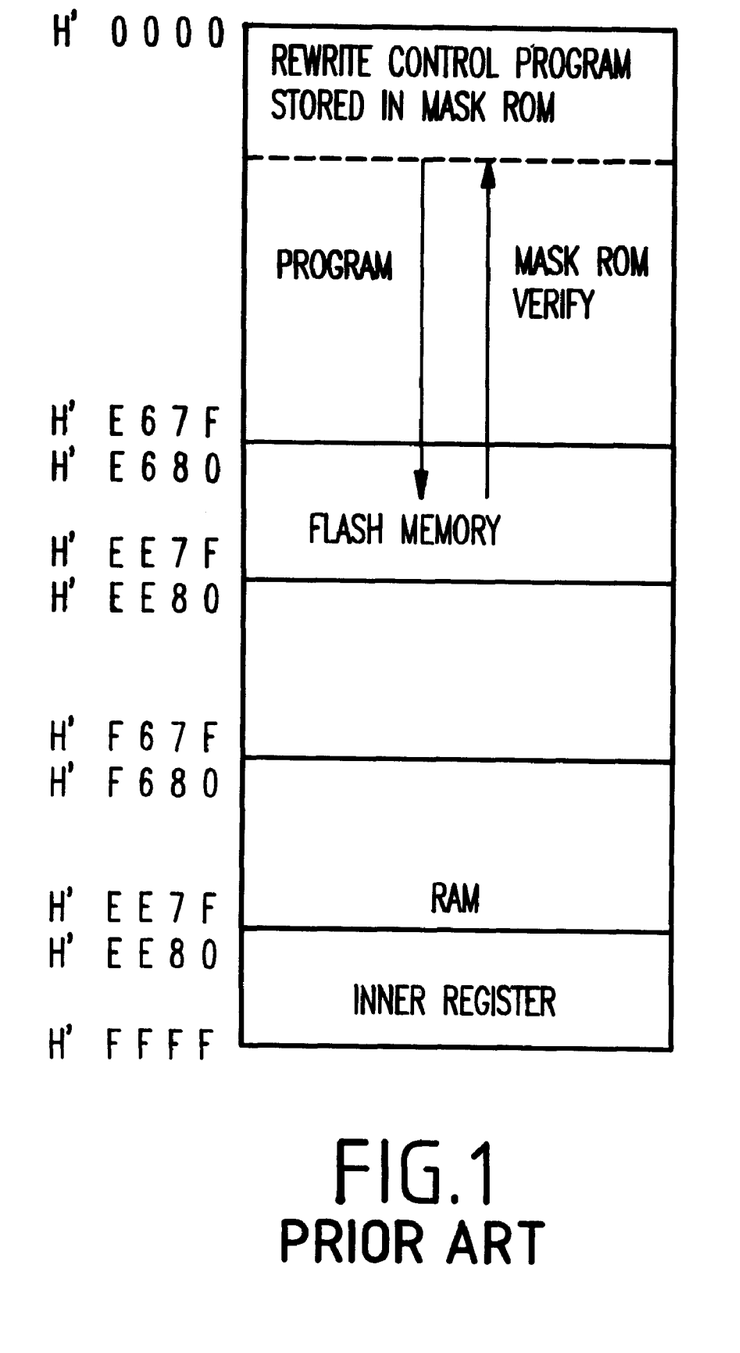
FIG. 1 shows the address space of a CPU in a microcomputer according to the third example of the prior art.

A microcomputer of the third example of the prior art is provided with both mask ROM and flash memory, and includes address space as shown in FIG. 1. In a microcomputer according to the third example of the prior art, programs or data that may require rewriting are stored in flash memory while programs or data that do not require rewriting are stored in mask ROM. Further, as will be understood by referring to FIG. 1, a rewrite control program for rewriting the content of flash memory is stored in mask ROM. A microcomputer having this configuration of the third example of the prior art can carry out rewriting in accordance with the rewrite control program stored in the mask ROM should the need arise to rewrite the content stored in the flash memory. As can also be understood from FIG. 1, data or programs not requiring rewriting and the rewrite control program reside in the same address space in the third example of the prior art and can mutually refer to each other.

Nevertheless, a microcomputer of the above-described third example of the prior art has the following problems when the rewrite control program is to be modified.

Rewrite control programs are generally subject to version upgrades. As can be understood by referring to FIG. 1, the rewrite control program in the third example of the prior art is arranged beginning from the leading address of the mask ROM, and in addition, resides in the same address space as the address space in which, for example, content within user code/data resides that does not require rewriting. Accordingly, if a rewrite control program undergoes a modification such as the upgrade is larger than the program before modification, a microcomputer of the third example of the prior art is subject to the problem that at least the area of user code/data stored in mask ROM will be encroached upon by the rewrite control program when the rewrite control program is modified.

In addition, when encroachment of the user code/data area by the rewrite control program occurs, changes will occur in, for example, addresses designated in the user code/data. As a result, in a microcomputer according to the third example of the prior art, the user code/data must be changed in order to deal with such modifications of address designation even when there is no actual need for change of the content. In other words, in the third example of the prior art, there exists the problem that even user code/data that fundamentally require no change in content must be newly produced as the result of, for example, modifications of the rewrite control program.

SUMMARY OF THE INVENTION

The object of the present invention is to provide a microcomputer directed toward solving these problems whereby, in cases in which a rewrite control program is modified, new user code/data need not be produced when there is no actual need to revise the user code/data.

The inventors of the present invention believe that the above-described problems are brought about because, in a microcomputer according to the third example of the prior art, user code/data and rewrite control programs for rewriting the content of, for example, flash memory reside in the same address space, and to solve the above-described problems, have elected to arrange the rewrite control program and user code/data in differing address space.

In concrete terms, the present invention provides a microcomputer described hereinbelow as a means for solving the above-described problems.

The present invention proposes a microcomputer that is provided with a CPU, mask ROM, and an electrically erasable and rewritable nonvolatile semiconductor memory; wherein rewrite user code/data that is information within user code/data that may be rewritten is stored in the nonvolatile semiconductor memory; a rewrite control program, which is a program that controls rewriting of the content stored in the nonvolatile semiconductor memory, and non-rewrite user code/data, which is information within the user code/data that does not require rewriting, are stored in the mask ROM; and wherein the non-rewrite user code/data and the rewrite control program are arranged in differing address space as seen from the CPU.

Here, in the above-described microcomputer, the CPU designates addresses for the address space in which the non-rewrite user code/data resides during a first mode in which operating processes are carried out according to the user code/data, and designates addresses for the address space in which the rewrite control program resides during a second mode in which the content of the nonvolatile semiconductor memory is rewritten.

As a simple configuration for this purpose, the microcomputer is provided with physically different first and second mask ROM as the mask ROM. In a microcomputer configured in this way, non-rewrite user code/data are stored in the first mask ROM, and the rewrite control program is stored in the second mask ROM.

The microcomputer is further provided with a mode signal input terminal, a mode detector, a control register, and a bus switch. The mode signal input terminal is for inputting from the outside second mode signals that indicate transitions to the second mode. The mode detector is connected to the mode signal input terminal as well as to the first and second mask ROM, and is a device for both enabling the first mask ROM and disabling the second mask ROM to establish the first mode during normal operations. Then, when a second mode signal is inputted to the mode signal input terminal, the mode detector detects the second mode signal and both disables the first mask ROM and enables the second mask ROM to bring about the transition to the second mode. The control register is connected to the mode detector and is provided for rewriting the content of the nonvolatile semiconductor memory in accordance with directions from the CPU during the second mode. The bus switch is connected to the mode detector, and is provided both for connecting the data bus and address bus for the nonvolatile semiconductor memory to the data bus and address bus from the CPU during the first mode, and for connecting the data bus and address bus for the nonvolatile semiconductor memory to the data bus and address bus from the control register during the second mode.

If the content stored in the nonvolatile semiconductor memory in this microcomputer is set to reside in the address space in which the non-rewrite user code/data reside, and the content stored in the control register is set to reside in the address space in which the rewrite control program resides, the configuration can be established such that the nonvolatile semiconductor memory cannot be referred to directly from the CPU during the second mode.

The control register is provided with an address point register, a write buffer register, and a mode control register. The address point register is for setting the address within the nonvolatile semiconductor memory to be designated by the CPU during the second mode. The write buffer register is for setting data to be written to the nonvolatile semiconductor memory from the CPU during the second mode. The mode control register is provided to receive commands from the CPU to that control register to write to the nonvolatile semiconductor memory during the second mode, and to control the writing of the data that have been set in the write buffer register to the nonvolatile semiconductor memory in accordance with addresses that have been set in the address point register.

With this configuration, each of the user code/data and rewrite control program can be handled independently, thereby providing a solution to the problem of the third example of the prior art described hereinabove.

According to the present invention, user code/data and rewrite control program are arranged in different address spaces as seen from the CPU as explained hereinabove, and as a result, when the rewrite control program undergoes modification, the rewrite control program does not encroach upon the area of the user code/data despite increases in program size.

DETAILED DESCRIPTION OF THE PREFERRED EMBODIMENTS

Explanation is next presented regarding an embodiment of a microcomputer according to the present invention with reference to FIGS. 2 to 8.

Figure 2:
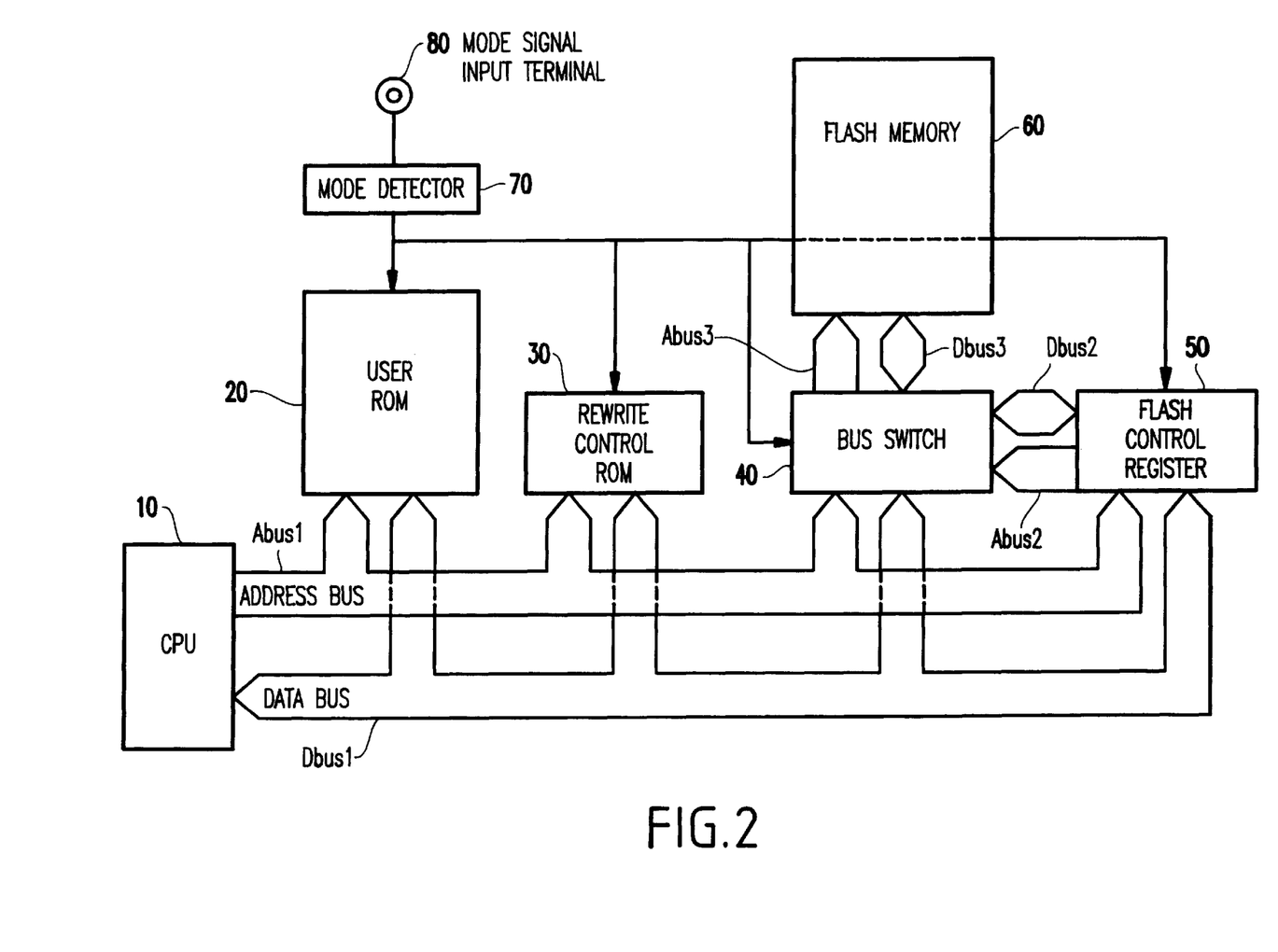
FIG. 2 is a block diagram showing the configuration of a microcomputer according to an embodiment of the present invention.

As shown in FIG. 2, a microcomputer according to this embodiment is provided with CPU (Central Processing Unit) 10, user ROM 20, rewrite control ROM 30, bus switch 40, flash control register 50, flash memory 60, mode detector 70, and mode signal input terminal 80.

User ROM 20 is mask ROM for storing non-rewrite user code/data. In this case, user ROM 20 may also be another form of ROM such as PROM (Programmable Read Only Memory) which has small memory cell size. In addition, non-rewrite user code/data is information within the user code/data that does not require rewriting (in other words, that can be fixed). In contrast to non-rewrite user code/data, rewrite user code/data is information within user code/data other than non-rewrite user code/data, i.e., information that may be rewritten.

Rewrite control ROM 30 is mask ROM for storing a rewrite control program, which is a program for controlling rewriting in cases in which information stored in flash memory 60 must be rewritten. This rewrite control ROM 30 is provided as physically distinct from user ROM 20. As with user ROM 20, rewrite control ROM 30 may also be constituted by ROM other than mask ROM.

Bus switch 40 is connected to CPU 10 by means of address bus A-bus 1 and data bus D-bus 1. Bus switch 40 is also connected to flash control register 50 by means of address bus A-bus 2 and data bus D-bus 2, and furthermore, to flash memory 60 by means of address bus A-bus 3 and data bus D-bus 3. Bus switch 40 is provided for switching the connection destinations of address bus A-bus 3 and data bus D-bus 3 to flash memory 60 according to whether the microcomputer is operating according to user code/data as normal or is rewriting information stored in flash memory 60.

For convenience'sake in the following description, a case in which the microcomputer is operating in accordance with user code/data as normal is referred to as the first mode, and a case in which the microcomputer is rewriting information stored in flash memory 60 is referred to as the second mode.

In more detail, during the first mode, bus switch 40 connects address bus A-bus 1 and data bus D-bus 1 from CPU 10 to address bus A-bus 3 and data bus D-bus 3, which lead to flash memory 60. On the other hand, during the second mode, bus switch 40 switches address bus A-bus 3 and data bus D-bus 3, which lead to flash memory 60, from address bus A-bus 1 and data bus D-bus 1 to address bus A-bus 2 and data bus D-bus 2 from flash control register 50. As can be understood from FIG. 2, the bidirectional bus is the data bus, and the unidirectional bus is the address bus.

Flash control register 50 is provided for receiving requests from CPU 10 during the second mode and for carrying out, for example, writing of data to flash memory 60. In more detail, flash control register 50 is provided with an address point register, a write buffer register, and a mode control register. The address point register is provided for setting the addresses to be written to in flash memory 60. The write buffer register is provided for setting data to be written to flash memory 60. The mode control register is provided for setting a prescribed value indicating commands such as write or delete to flash memory 60. Provided with this configuration, flash control register 50 can confer address/data to flash memory 60 at an appropriate timing by way of bus switch 40 when the addresses that are to be the write destination are set in the address point register, the data to be written are set in the address buffer register, and a value appropriate to a write command is set in the mode control register.

Flash memory 60 is provided for storing rewrite user code/data. Flash memory 60 is only one example, and this memory may also be constituted by electrically erasable and rewritable memory such as EEPROM or other nonvolatile semiconductor memory.

When a second mode signal indicating a transition to the second mode is inputted from mode signal input terminal 80, mode detector 70 detects the second mode signal and in response, sends control signals.

In more detail, mode detector 70 both enables user ROM 20 and disables rewrite control ROM 30 and flash control register 50 during the first mode, i.e., until detection of the second mode signal. In addition, mode detector 70 effects control such that bus switch 40 connects address bus A-bus 1 and data bus D-bus 1 to address bus A-bus 3 and data bus D-bus 3 during the first mode.

Upon detecting second mode signal, mode detector 70 both disables user ROM 20 and enables rewrite control ROM 30 and flash control register 50. In addition, mode detector 70 effects control such that bus switch 40 switches address bus A-bus 3 and data bus D-bus 3 from address bus A-bus 1 and data bus D-bus 1 and connects them to address bus A-bus 2 and data bus D-bus 2.

In a microcomputer according to this embodiment and having this configuration, CPU 10 can access user ROM 20 during the first mode but cannot access rewrite control ROM 30, and while in the second mode, can access rewrite control ROM 30 but not user ROM 20. In addition, CPU 10 can directly access flash memory 60 during the first mode, but can access flash memory 60 only by way of flash control register 50 during the second mode. In other words, flash memory 60 can be viewed from CPU 10 during the first mode but cannot be viewed from CPU 10 during the second mode. As can be understood from these points, user code/data and rewrite control program are arranged in different address space in the present embodiment.

Explanation is next presented regarding the operation of the microcomputer during each mode according to this embodiment.

First, during the first mode, user ROM 20 is enabled, rewrite control ROM 30 is disabled, and address bus A-bus 1 and data bus D-bus 1 from CPU 10 are selected by bus switch 40 as described hereinabove. This state is shown schematically in FIG. 3.

Figure 3:
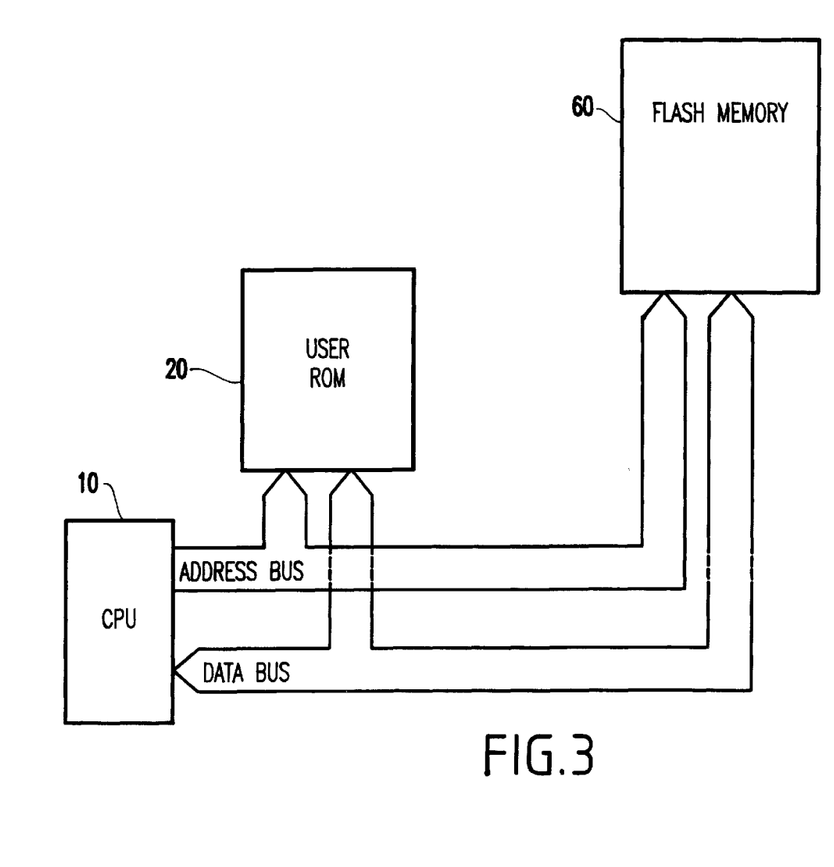
FIG. 3 is a block diagram showing the schematic configuration of a microcomputer of the present embodiment during the first mode.
Figure 4:
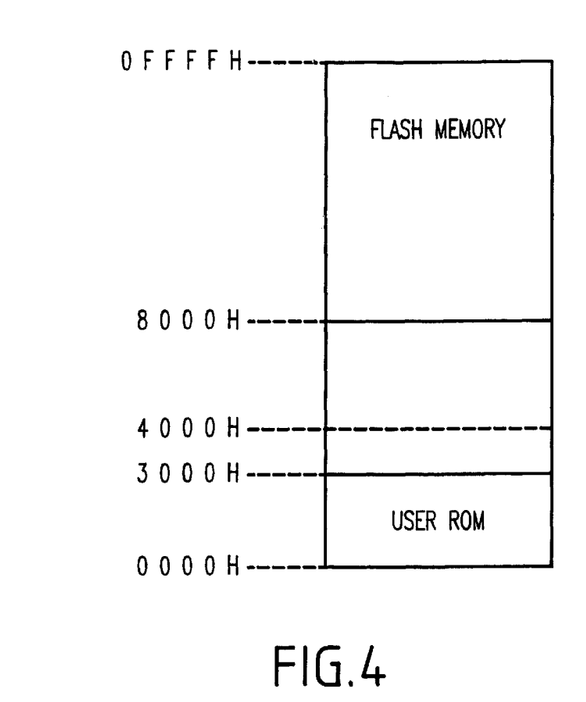
FIG. 4 shows the address space of a CPU in the configuration of FIG. 2.

In the state shown in FIG. 3, CPU 10 carries out processing in accordance with user code/data stored in user ROM 20 and flash memory 60. During the first mode, the address space of CPU 10 is, for example, as shown in FIG. 4. The non-rewrite user code/data stored in user ROM 20 are arranged in the region "0000H-3000H," and the rewrite user code/data stored in flash memory 60 are arranged in the region "8000H-OFFFF H." In other words, user ROM 20 and flash memory 60 are in what is called a "visible" state from CPU 10 during the first mode.

During the second mode, as described hereinabove, user ROM 20 is placed in a disabled state, rewrite control ROM 30 is placed in an enabled state, and bus switch 40 selects address bus A-bus 2 and data bus D-bus 2 from flash control register 50. This state is shown schematically in FIG. 5.

Figure 5:
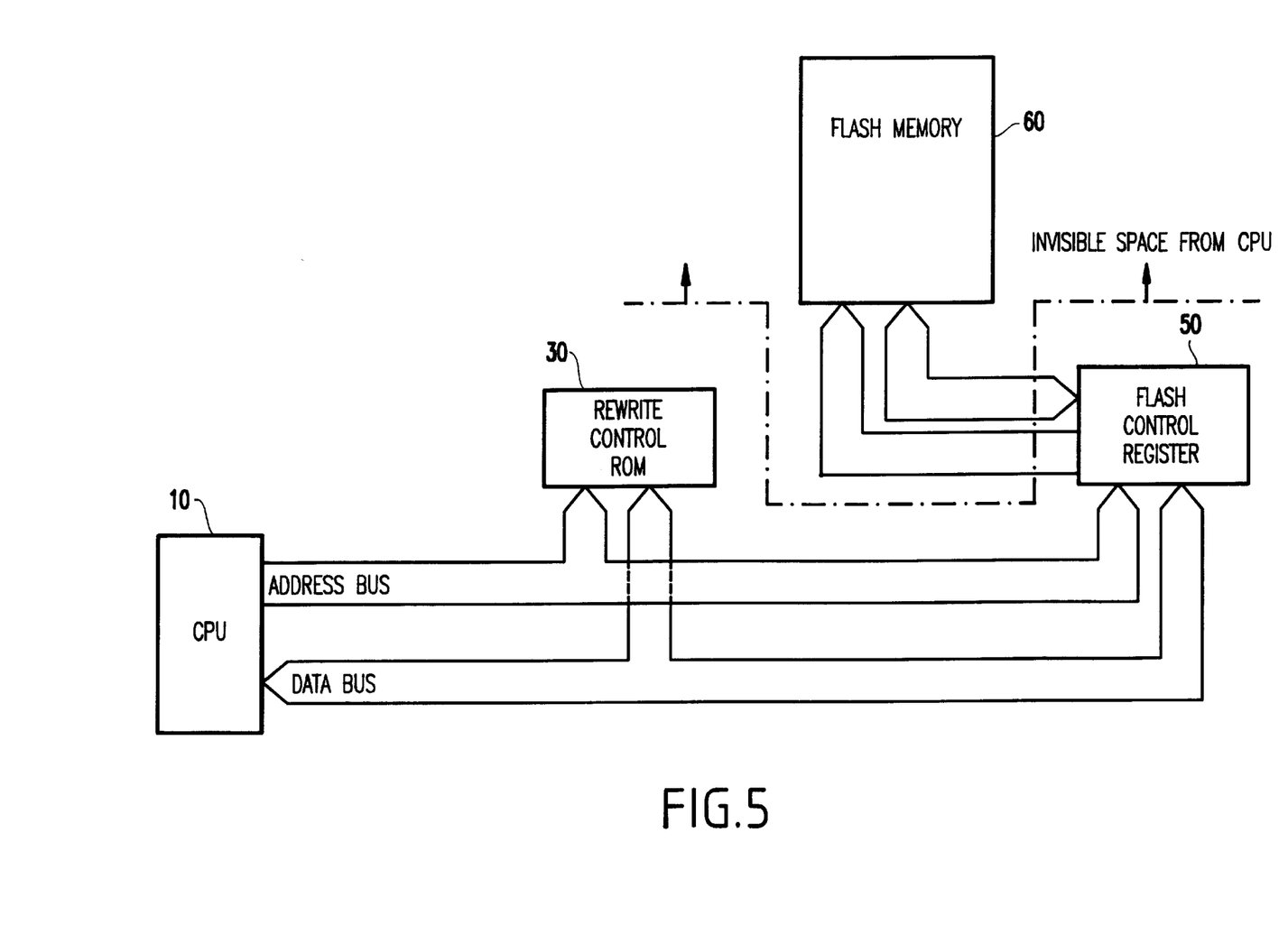
FIG. 5 is a block diagram showing the schematic configuration of a microcomputer of this embodiment during the second mode.
Figure 6:
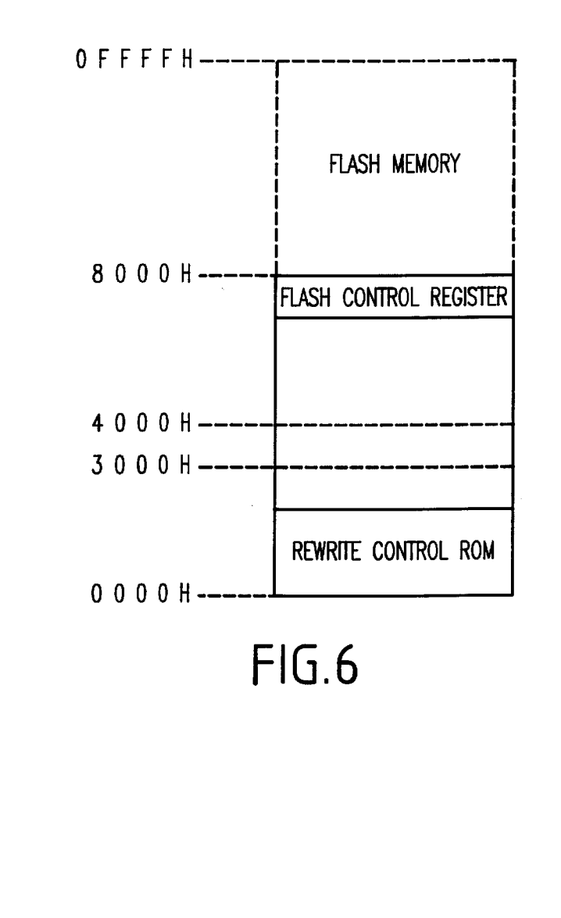
FIG. 6 shows the address space of the CPU in the configuration of FIG. 4.

In the state shown in FIG. 5, CPU 10 erases and rewrites the content of flash memory 60 in accordance with the rewrite control program stored in rewrite control ROM 30. In this case, as can be understood from FIG. 5, CPU 10 cannot directly access flash memory 60 during the second mode. As a result, CPU 10 erases and rewrites the content stored in flash memory 60 by way of flash control register 50. In other words, during the second mode, only rewrite control ROM 30 and flash control register 50 are placed in a "visible" state from CPU 10, and flash memory 60 is placed in an "invisible" state from CPU 10. In addition, during the second mode, the address space of CPU 10 becomes, for example, as shown in FIG. 6. The rewrite control program stored in rewrite control ROM 30 is arranged in the region "0000 H-3000H," and the storage area of flash control register 50 is arranged between "4000 H" and "8000 H."

As can be understood from FIG. 4 and FIG. 6, user code/data and rewrite control program are arranged in different address space in this embodiment. As a result, user code/data are not encroached upon by the rewrite control program when upgrades or other modifications are made to the rewrite control program stored in rewrite control ROM 30.

Explanation is next presented regarding an actual example of the operation of CPU 10.

Figure 7:
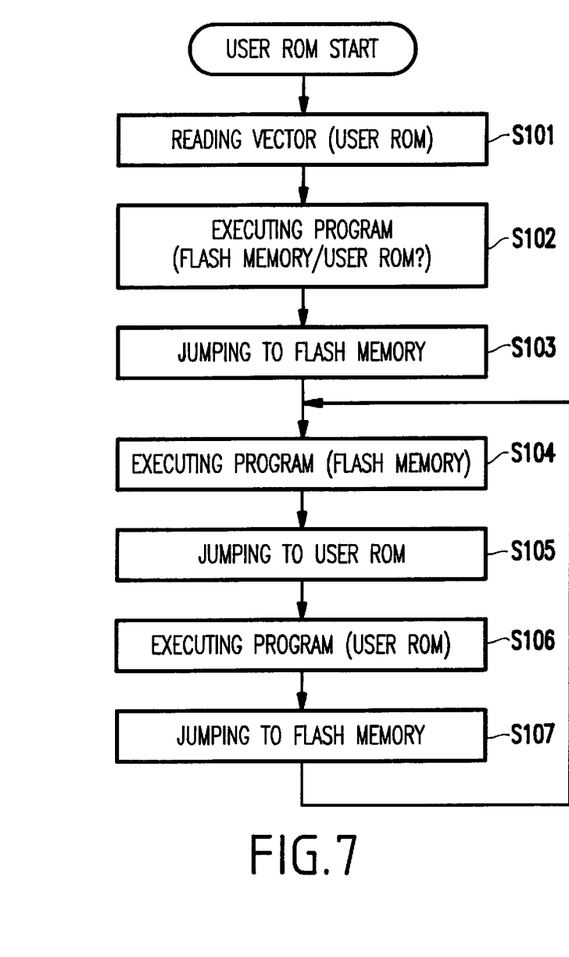
FIG. 7 is a flow chart illustrating CPU operations during the first mode in an embodiment of the present invention.

The CPU operates as shown in FIG. 7 during the first mode.

First, CPU 10 carries out vector reading during the first mode by accessing user ROM 20 (Step S101). In this case, vector reading refers to the following type of operation: CPU 10 outputs "0000 H" to address bus A-bus 1 and reads a 2-byte value (the "reset vector") from "0000 H" in the address space. Next, CPU 10 outputs the value indicated by the reset vector to address bus A-bus 1, reads the value greater than 1 byte (command code) at the address indicated by the reset vector, and executes the corresponding command code. As another example of vector reading, a case can be taken in which, in an architecture in which CPU 10 executes command code from "0000 H" after releasing reset, a jump command is stored at "0000 H" instead of a reset vector, and CPU 10 executes this jump command.

CPU 10 next carries out normal processing while referring to non-rewrite user code/data stored in user ROM 20 and rewrite user code/data stored in flash memory 60 (Step S102–Step S107).

Figure 8:
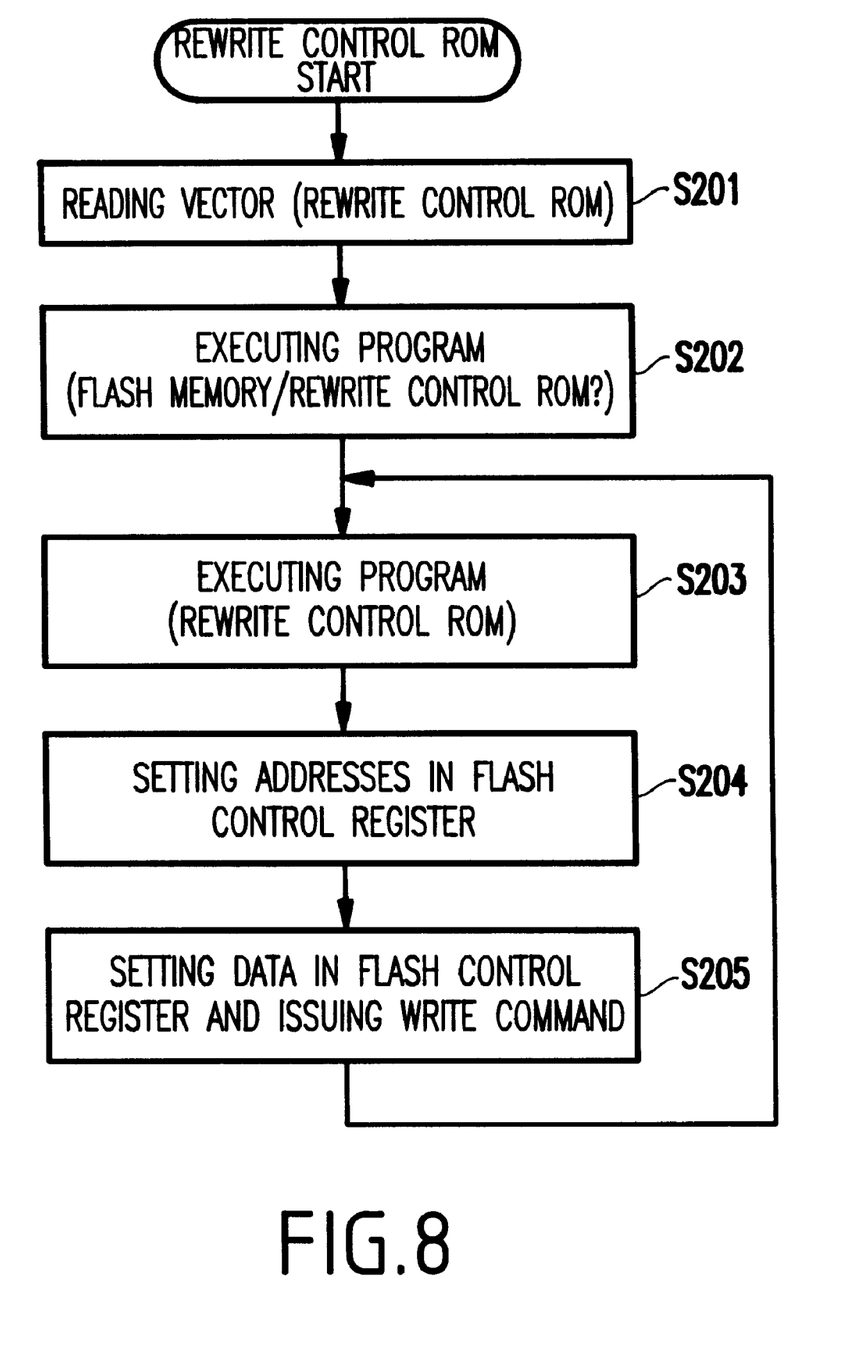
FIG. 8 is a flow chart illustrating CPU operations during the second mode in an embodiment of the present invention.

Alternatively, the CPU operates as shown in FIG. 8 during the second mode.

In the second mode, CPU 10 first carries out vector reading by accessing rewrite control ROM 30.

CPU 10 then proceeds by executing programs (Step S202) and carries out the rewrite control program stored in rewrite control ROM 30 (Step S203). Next, the addresses that will be the write destinations in flash memory 60 are set in flash control register 50 (Step S204), the data to be written are set in flash control register 50, and a write command is issued (Step S205). The processes of Step S203 to Step S205 are then repeated until the rewriting of flash memory 60 is completed.

While a preferred embodiment of the present invention has been described using specific terms, such description is for illustrative purposes only, and it is to be understood that changes and variations may be made without departing from the spirit or scope of the following claims.

What is claimed is:

1. A microcomputer comprising:
    a central processing unit (CPU);
    an electrically erasable and rewritable nonvolatile semiconductor memory that stores rewrite user code/data, which is information within user code/data that may be rewritten; and
    a mask read-only memory (ROM) that stores non-rewrite user code/data, which is information that does not require rewriting within said user code/data and a rewrite control program, which comprises a program for controlling the rewriting of content stored in said nonvolatile semiconductor memory,
    wherein said non-rewrite user code/data and said rewrite control program are arranged in different address space as seen from said CPU, and
    wherein said different address space is on a physically separate mask ROM.

2. The microcomputer according to claim 1, wherein said mask ROM comprises:
    a first mask ROM that stores said non-rewrite user code/data; and
    a second mask ROM that stores said rewrite control program,
    wherein said first and second mask ROMs are physically different ROMs.

3. The microcomputer according to claim 2, wherein said first and second mask ROMs comprise non-mask ROMs.

4. The microcomputer according to claim 2, wherein said first mask ROM comprises a plurality of mask ROM memories, and
    wherein said second mask ROM comprises a plurality of mask ROM memories.

5. The microcomputer according to claim 1 wherein:
    content stored in said nonvolatile semiconductor memory resides in said address space in which said non-rewrite user code/data are present;
    content stored in said control register resides in said address space in which said rewrite control program is present; and
    said nonvolatile semiconductor memory is isolated from and not directly consulted by said CPU during said second mode.

6. The microcomputer according to claim 1, wherein said CPU comprises:
    a mode designator that designates addresses for said address space in which said non-rewrite user code/data resides, and executes an operation process according to user code/data.

7. The microcomputer according to claim 1, wherein said CPU comprises:
    a mode designator that designates addresses for said address space in which said rewrite control program resides, and rewrites the content of said nonvolatile semiconductor memory.

8. The microcomputer according to claim 1, wherein said CPU comprises:
    mode means for designating addresses for said address space in which said non-rewrite user code/data resides, and executing an operation process according to user code/data.

9. The microcomputer, as claimed in claim 8, wherein said second memory comprises a mask ROM.

10. The microcomputer according to claim 1, wherein said CPU comprises:
    mode means for designating addresses for said address space in which said rewrite control program resides, and rewriting the content of said nonvolatile semiconductor memory.

11. The microcomputer according to claim 1, wherein said CPU comprises:
    a first mode designator that designates addresses for said address space in which said non-rewrite user code/data resides, and executes an operation process according to user code/data; and
    a second mode designator that designates addresses for said address space in which said rewrite control program resides, and rewrites the content of said nonvolatile semiconductor memory.

12. The microcomputer, as claimed in claim 11, further comprising:
    a first mode selector for selecting a first mode, said selector designating addresses for an address space in which said non-rewrite user code/data resides, and executes an operation process according to user code/data; and
    a second mode selector for selecting a second mode, said second mode designating addresses for an address space in which said rewrite control program resides, and rewrites the content of said nonvolatile semiconductor memory.

13. The microcomputer, as claimed in claim 11, wherein said first memory comprises a mask ROM.

14. A microcomputer comprising:
    a central processing unit (CPU);
    an electrically erasable and rewritable nonvolatile semiconductor memory that stores rewrite user code/data, which is information within user code/data that may be rewritten; and
    a mask read-only memory (ROM) that stores non-rewrite user code/data, which is information that does not require rewriting within said user code/data and a rewrite control program, which comprises a program for controlling the rewriting of content stored in said nonvolatile semiconductor memory, wherein said non-rewrite user code/data and said rewrite control program are arranged in different address space as seen from said CPU, wherein said different address space is on a physically separate mask ROM wherein said CPU comprises:

first mode means that designates addresses for said address space in which said non-rewrite user code/data resides, and executes an operation process according to user code/data; and second mode means that designates addresses for said address space in which said rewrite control program resides, and rewrites the content of said nonvolatile semiconductor memory.

15. The microcomputer according to claim 14, further comprising:

a mode signal input terminal for inputting, from the outside, second mode signals that indicate a transition to said second mode means; and a mode detector that is connected to said mode signal input terminal and said ROM, that normally both enables said first mask ROM and disables said second mask ROM to establish said first model, and, when said second mode signal is inputted to said mode signal input terminal, that detects the second mode signal and causes a transition to said second mode by both disabling said first mask ROM and enabling said second mask ROM.

16. The microcomputer according to claim 15, further comprising:

a control register that is both connected to said mode detector and that is for rewriting the content of said nonvolatile semiconductor memory during said second mode in accordance with directions from said CPU; and a bus switch that is connected to said mode detector and that connects the data bus and address bus for said nonvolatile semiconductor memory to the data bus and address bus from said CPU during said first mode, and to the data bus and address bus from said control register during said second mode.

17. The microcomputer according to claim 16, wherein said control register comprises:

an address point register for setting addresses within said nonvolatile semiconductor memory to be designated by said CPU during said second mode;

a write buffer register for setting data that are to be written to said nonvolatile semiconductor memory from said CPU during said second mode;

a mode control register for receiving commands from said CPU to said control register to write to said novolatile semiconductor memory, and for controlling writing of said data, which have been set in said write buffer register, to said nonvolatile semiconductor memory in accordance with said addresses, which have been set in said address point register.

18. A microcomputer comprising:

a central processing unit (CPU);

an electrically erasable and rewritable nonvolatile semiconductor memory for storing rewritable content; and a first memory for storing non-rewrite user code/data; and a second memory for storing a rewrite control program, said rewrite control program controlling the rewriting of content stored in said nonvolatile semiconductor memory;

wherein said first and second memories are physically separate ROMs.

* * * * *

UNITED STATES PATENT AND TRADEMARK OFFICE
CERTIFICATE OF CORRECTION

PATENT NO.     : 6,148,362
DATED          : November 14, 2000
INVENTOR(S)    : Sagi

It is certified that error appears in the above-identified patent and that said Letters Patent are hereby corrected as shown below:

```
Title page, item [30], change priority date to --May 29, 1997--
```

Signed and Sealed this

First Day of May, 2001

Attest:

NICHOLAS P. GODICI

Attesting Officer          Acting Director of the United States Patent and Trademark Office